J. O. WILES.
SANITARY CANDY PAIL RACK.
APPLICATION FILED MAR. 26, 1914.
1,138,340.
Patented May 4, 1915.
2 SHEETS—SHEET 1.
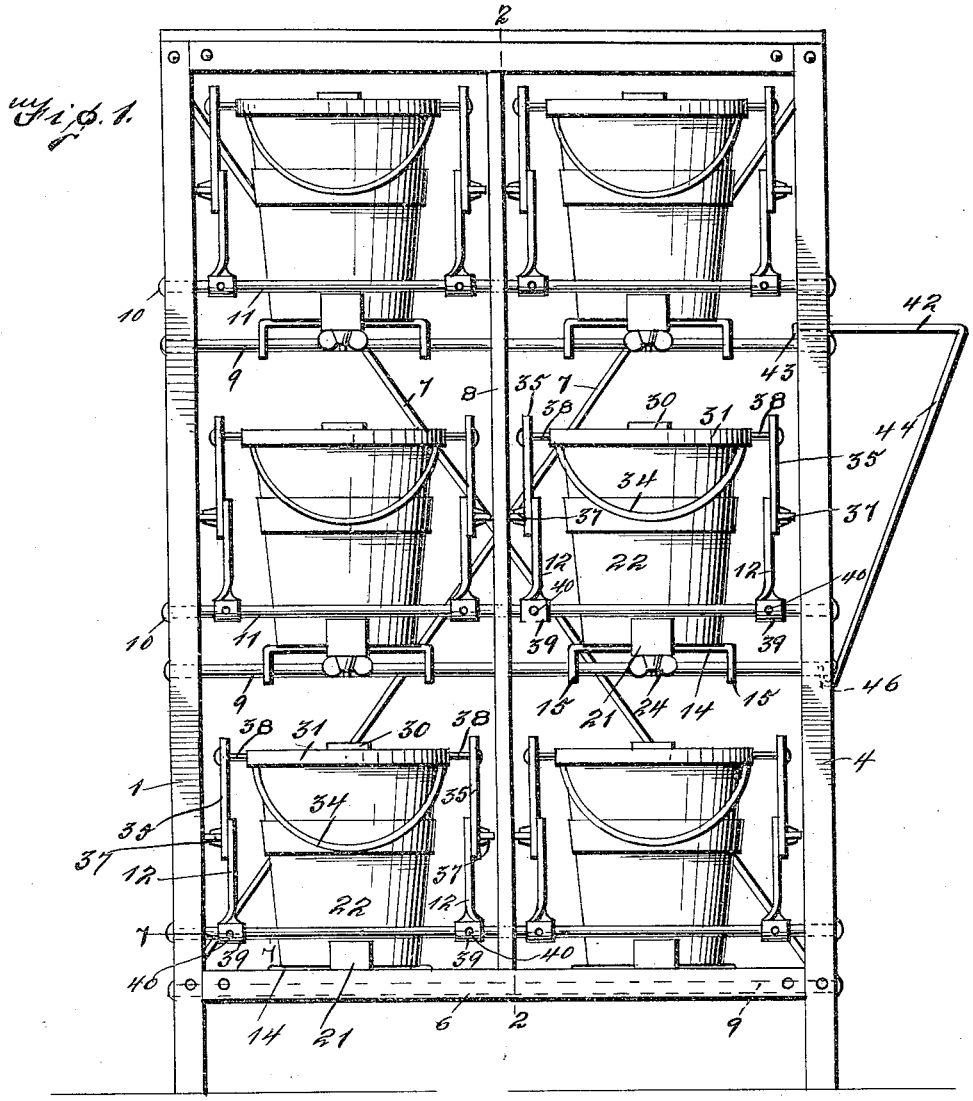
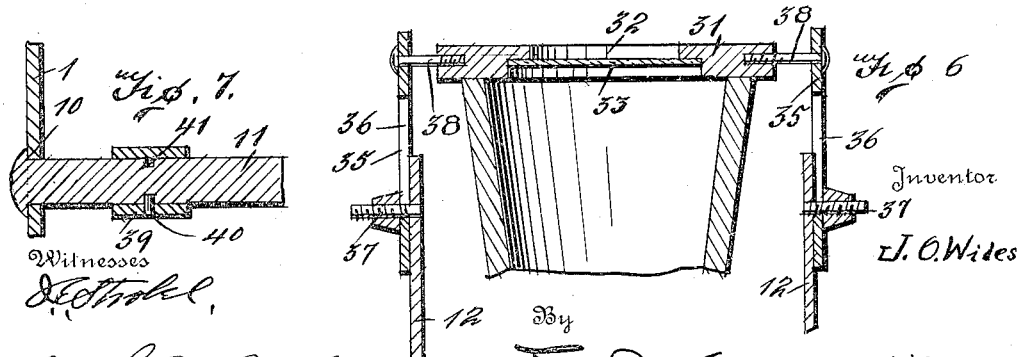

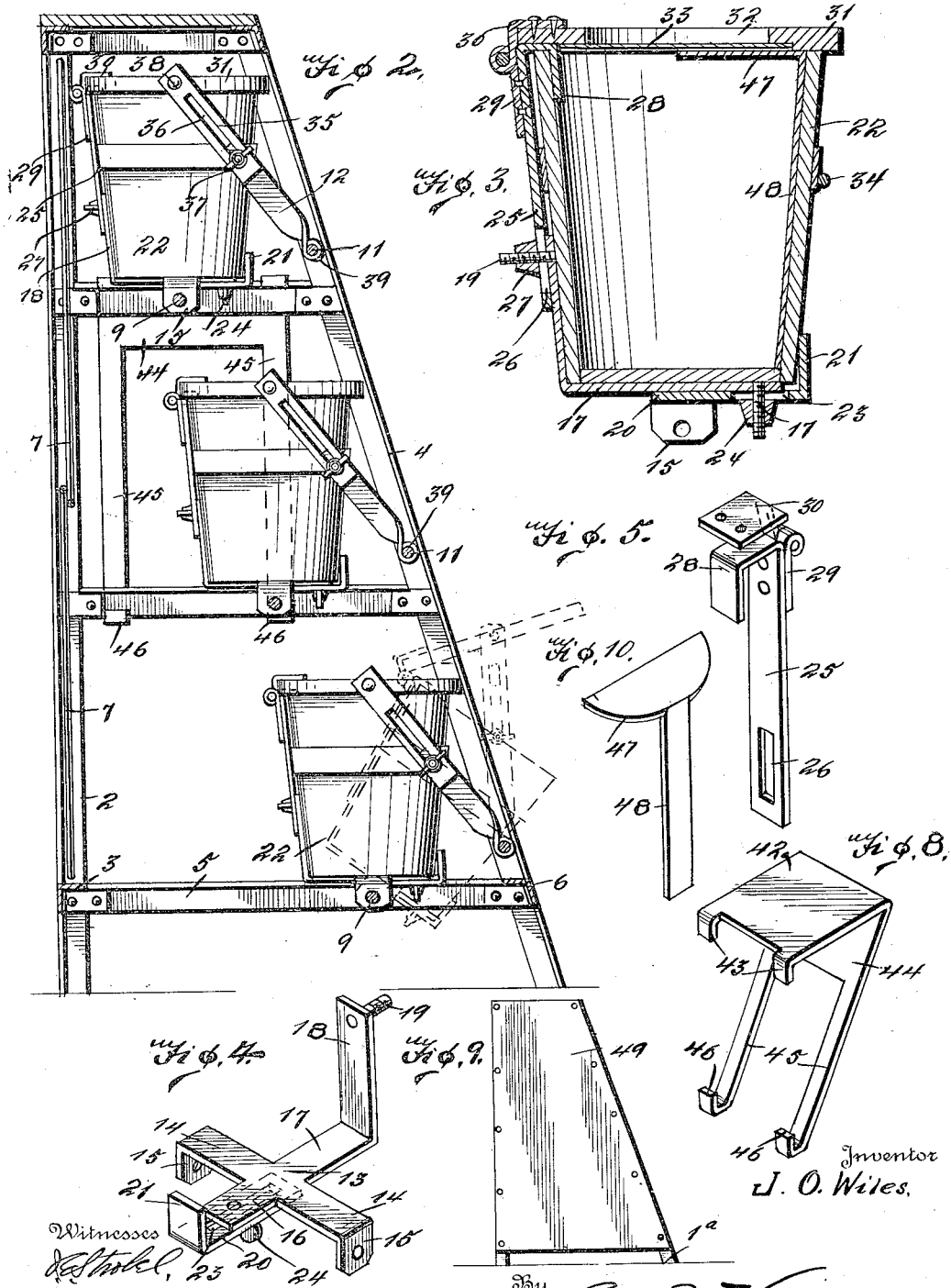

UNITED STATES PATENT OFFICE.

JOHN OTTO WILES, OF ORLEANS, NEBRASKA.

SANITARY CANDY-PAIL RACK.

1,138,340.  Specification of Letters Patent.  Patented May 4, 1915.

Application filed March 26, 1914. Serial No. 827,427.

*To all whom it may concern:*

Be it known that I, JOHN O. WILES, a citizen of the United States, residing at Orleans, in the county of Harlan and State of Nebraska, have invented certain new and useful Improvements in Sanitary Candy-Pail Racks, of which the following is a specification, reference being had therein to the accompanying drawing.

This invention relates to sanitary candy pail racks, and has for its object the production of a simple and efficient rack which will support a candy pail in such a manner as to keep the pail in a closed position and at the same time allow the top to automatically open as the pail is swung or tilted forward.

Another object of this invention is the production of a simple and efficient pail support which will efficiently hold the pail upon the rack and prevent the pail from becoming accidentally removed therefrom.

With these and other objects in view this invention consists of certain novel combinations, constructions, and arrangements of parts as will be hereinafter fully described and claimed.

In the accompanying drawings:—Figure 1 is a front elevation of the sanitary candy pail rack. Fig. 2 is a section taken on line 2—2, of Fig. 1. Fig. 3 is a vertical section through one of the candy pails. Fig. 4 is a detail perspective of one of the pail supporting frames carried by the rack. Fig. 5 is a detail perspective of the bracket adapted to support the cover of the pail. Fig. 6 is an enlarged transverse section through the upper end of one of the pails. Fig. 7 is a transverse sectional view taken on line 7—7, of Fig. 1. Fig. 8 is a detail perspective of a rack supported upon one side of the candy pail rack. Fig. 9 is a side elevation of an embodiment of the invention showing the body portion of the rack as being provided with a closed side. Fig. 10 is a perspective view of a candy retaining plate adapted to be placed in one of the candy pails to prevent the candy from falling therefrom, when the pail is tilted to a forward position.

By referring to the drawings it will be seen that 1 designates the main body of the candy pail rack which comprises a pair of rear vertical standards 2, which vertical standards are connected by means of the transversely extending angle braces 3. A pair of rearwardly inclined front members 4 are also carried by the body 1, and these inclined members 4 are connected to the rear vertical standards 2 by means of the transversely extending members 5. The body 1 is formed of angle irons so as to produce a rigid but light frame. The inclined standards 4 are braced by means of the transversely extending members 6 as is illustrated clearly in Fig. 1. It, of course, should be understood that the frame may be made as wide as desired to accommodate the desired number of pails and that any other minor details in the construction of the frame may be employed without departing from the spirit of the invention. The rear vertical standards 2 are braced by means of the cross-bracing members 7 as is illustrated clearly in Fig. 1, and the frame 1 carries a central brace 8 as is also illustrated in Fig. 1.

A plurality of pail supporting shafts 9 are connected to the transversely extending members 5 of the frame 1 and these shafts 9 have enlarged heads 10 to firmly hold the shafts 9 in engagement with the frame 1. The inclined members 4 of the frame 1 also carry transversely extending rods 11, which rods extend transversely of the front of the rack and constitute supports for the cover tilting arms 12, hereinafter described.

A pail supporting frame such as illustrated in detail in Fig. 4 is mounted upon each of the shafts 9 and this pail supporting frame comprises a substantially cross-shape body 13 having its laterally extending arms 14 provided with depending feet 15. The shafts 9 pass through the depending feet 15 to constitute an efficient journal for supporting the pail supporting frame upon the shaft 9. The pail supporting frame is also provided with a forwardly projecting finger 16 and a rearwardly extending finger 17. The rearwardly extending finger 17 terminates in a forwardly extending lip 18, which lip carries a threaded pin 19. The forwardly extending finger 16 carries a thumb screw for clamping the adjustable section 20 upon the finger 16. The adjustable member 20 is provided with a forwardly extending lip 21 for firmly engaging the front of the pail or bucket 22 adapted to be carried thereby. The adjustable member 20 is provided with a longitudinal slot 23 through which the thumb screw passes and a thumb nut 24 is threaded upon the lower end of the thumb screw for firmly clamping the adjustable section 20 in engagement with the forwardly extending finger 16.

A cover supporting bracket 25 is adjustably mounted upon the threaded pin 19 of the finger 18 and is provided with a longitudinally extending slot 26 upon the lower end thereof for fitting over the screw 19. A thumb nut 27 is threaded upon the screw 19 for firmly clamping the cover supporting bracket 25 in engagement with the finger 18. This cover supporting bracket 25 is provided with a substantially inverted U-shaped end 28 which substantially inverted U-shaped end fits over the upper edge of the candy pail 22 for firmly holding the bracket 25 in engagement with the pail 22. A hinge 29 is secured to the vertically extending bracket 25, and this hinge carries an overhanging lip 30, which lip extends normally at right angles to the bracket 25 and overhangs the cover 31 carried by the pail 22. This cover 31 is provided with a view-aperture 32, which view-aperture is normally closed by means of a glass or other transparent plate 33 to allow the contents of the pail to be viewed if it should be so desired.

The pails 22 are provided with the ordinary bails 34 to facilitate the handling of the pails in the usual manner and it should be understood that the pails may be readily disengaged from the pail supporting frame 13 and removed from the rack 1 by disengaging the pail from the several portions of the pail supporting frame, thereby allowing the pails to be renewed at all times keeping the full pail in position upon the rack.

A plurality of tilting arms 12 are carried by the transversely extending bars 11 as previously described and these tilting arms are provided with adjustable ends 35, which ends are provided with longitudinally extending slots 36 for receiving the thumb screws 37 in order to permit the arms 11 to be adjusted to the desired length. The adjustable ends 35 of the arms 12 are connected to the edges of the covers 31 of the buckets by means of the transversely extending pins 38 so as to cause the covers 31 of the buckets to be raised to the position shown in dotted lines in Fig. 2 when the pail is thrown forward or tilted forward to the position shown in dotted lines in Fig. 2.

It, of course, should be understood that as many of these pails may be employed upon the rack as is desired, and the present device is not limited to merely using two rows of pails as any number of rows may be employed without departing from the spirit of the invention.

For the purpose of simplifying the description of the device only one of the pail supporting brackets has been described as all of the brackets and cover operating devices are of similar construction. The cover raising arms 12 are provided with rolled portions 39 at their lower ends which carry pins 40, which pins fit in the grooves 41 formed in the shafts 9 to constitute means for holding the cover raising arms against longitudinal movement upon the bars 11.

A shelf or bracket 42 is carried by the frame 1 and is provided with depending lips 43, which depending lips overhang the upper face of one of the transversely extending bars 5. The bracket 42 is provided with a downwardly inclined body portion 44 which terminates in a pair of parallel arms 45, and these arms 45 are provided with forwardly extending lips 46, which lips 46 engage the under face of the adjacent transversely extending bar 5 of the frame as is illustrated in Figs. 1 and 2, and in this manner firmly hold the bracket or shelf 42 upon the frame 1. It should be understood that the shelf or bracket 42 may be used for placing a scale upon the side of the pail rack so as to be convenient when weighing the candy, or the bracket may be used for the purpose of wrapping the packages of candy.

A candy retaining plate 47 is carried within the pail 22 and extends over the front portion thereof so as to prevent the candy from dropping accidentally from the pail 22. The plate 47 is provided with a downwardly extending finger 48, which finger is adapted to fit snugly against the inner face of the pail 22 and firmly hold the plate 47 in the proper position within the pail 22.

In Fig. 9 there is shown an embodiment of the invention in which the frame 1ª of the pail rack is provided with side plates 49 for closing the side of the rack and upon these plates may be placed any advertising matter which may be desired.

From the foregoing description it will be seen that a very simple and efficient device has been produced for allowing the candy pails to be automatically opened as the same are thrown to a forward position as shown in dotted lines in Fig. 2, and at the same time will cause the pail to be automatically closed to prevent dust from entering the pail, and also to keep flies and other insects away from the candy which might be attracted thereby.

It should be understood that the transversely extending bars 11 will constitute stops for limiting the forward movement of the pail, and that the arms 12 will limit the rearward movement of the pails so as to prevent the pails from swinging from the rack in such a position as to discharge candy contained therein from the pails.

Having thus described the invention what is claimed as new, is:—

1. A device of the class described comprising a frame, a shaft carried by said frame, a pail supporting bracket comprising a cross-shaped body provided with laterally extending fingers terminating in downwardly extending lips, said shaft extending through said lips for pivotally mounting said bracket upon said shaft, said body provided with a forwardly and a rearwardly extending finger, an adjustable section carried by said forwardly extending finger for engaging the front of said pail, said rearwardly extending finger provided with an upwardly extending portion, a cover engaging member adjustably mounted upon said rearwardly extending finger, a cover hingedly secured to said cover engaging member, a transversely extending bar carried by said frame, and cover raising arms secured to said bar and also secured to said cover for causing said cover to be swung to an open position as said bucket is tilted forwardly.

2. A device of the class described comprising a frame, a shaft carried thereby, a pail supporting bracket carried by said shaft, said pail supporting bracket provided with downwardly extending ears, said shaft extending through said ears, a pail carried by said pail supporting bracket, an adjustable cover supporting member engaging said pail and secured to said pail supporting bracket, a hinge carried thereby, said hinge provided with a right angularly extending leaf, said leaf engaging said cover, said leaf constituting a means for supporting said cover, and adjustable arms carried by said frame and engaging said cover for swinging said cover to an open position as said pail is swung forwardly.

3. A device of the class described comprising a frame, a shaft carried by said frame, a pail supporting bracket carried by said shaft, a cover, cover raising arms secured to said cover, a transversely extending rod secured to said frame and engaging the lower ends of said cover raising arms, said rod adapted to constitute a stop for limiting the forward swinging movement of said pail, and an adjustable hinge secured to said bracket and engaging said cover for hingedly securing said cover upon said pail.

In testimony whereof I hereunto affix my signature in presence of two witnesses.

JOHN OTTO WILES.

Witnesses:
  B. B. WEBBER,
  E. H. WEBBER.

Copies of this patent may be obtained for five cents each, by addressing the "Commissioner of Patents, Washington, D. C."